(12) United States Patent
Lehmann (10) Patent No.: US 8,151,631 B2
(45) Date of Patent: *Apr. 10, 2012

(54) METHODS FOR MANUFACTURING UNLEAKY CLOSED CONTAINERS AND LEAK TESTING APPARATUS

(76) Inventor: Martin Lehmann, Wohlen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,145

(22) Filed: Jul. 30, 2009

(65) Prior Publication Data

US 2009/0288478 A1 Nov. 26, 2009

Related U.S. Application Data

(62) Division of application No. 11/959,925, filed on Dec. 19, 2007, now Pat. No. 7,584,650, which is a division of application No. 11/221,803, filed on Sep. 9, 2005, now Pat. No. 7,380,440.

(51) Int. Cl.
*G01M 3/34* (2006.01)
*G01M 3/04* (2006.01)

(52) U.S. Cl. .......................................... 73/49.3; 73/45.4

(58) Field of Classification Search ............. 73/40, 49.2, 73/45.4, 41, 45.1, 49.3
See application file for complete search history.

(56) References Cited

U.S. PATENT DOCUMENTS

| | | | |
|---|---|---|---|
| 3,586,165 A * | 6/1971 | Keinanen ...................... 209/70 |
| 4,862,732 A | 9/1989 | Raymond et al. | |
| 4,930,345 A | 6/1990 | Bausch | |
| 5,111,684 A | 5/1992 | Stauffer et al. | |
| 5,767,392 A * | 6/1998 | Belcher et al. ..................... 73/41 |
| 5,918,270 A | 6/1999 | Heuft | |
| 6,330,823 B1 | 12/2001 | Raymond | |
| 6,439,032 B1 | 8/2002 | Lehmann | |
| 6,557,395 B2 | 5/2003 | Lehmann | |
| 6,840,087 B2 | 1/2005 | Lehmann | |
| 7,380,440 B2 | 6/2008 | Lehmann | |
| 7,584,650 B2 * | 9/2009 | Lehmann ....................... 73/49.3 |

FOREIGN PATENT DOCUMENTS

| | | |
|---|---|---|
| EP | 0 522 440 A2 | 1/1993 |
| WO | WO 00/73760 A2 | 12/2000 |
| WO | WO 02/73151 A1 | 3/2002 |

OTHER PUBLICATIONS

International Search Report, PCT/CH2005/000538 filed Sep. 9, 2005.

* cited by examiner

*Primary Examiner* — John Fitzgerald
(74) *Attorney, Agent, or Firm* — Antonelli, Terry, Stout & Kraus, LLP.

(57) ABSTRACT

In a leak testing apparatus and a method for manufacturing unleaky closed containers having first and second flexible wall areas with different flexibility characteristics, a biasing member is moved toward and onto the first flexible area and a force detector monitors a biasing force at the second flexible area. A container is considered unleaky if a difference signal from force measuring signals at first and second points in time fulfills a test criteria. Sampling the biasing force monitored which results in the first force measuring signal includes determining maximum biasing force signal value which occurs during a time span up to and including the first point in time.

17 Claims, 8 Drawing Sheets

METHODS FOR MANUFACTURING UNLEAKY CLOSED CONTAINERS AND LEAK TESTING APPARATUS

RELATED APPLICATION

This application is a divisional application of application Ser. No. 11/959,925, filed Dec. 19, 2007, now U.S. Pat. No. 7,584,650 issued Sep. 8, 2009, which is a divisional application of application Ser. No. 11/221,803, filed Sep. 9, 2005, now U.S. Pat. No. 7,380,440, issued Jun. 3, 2008, the disclosure of which is hereby incorporated by reference.

TECHNICAL FIELD

The present invention departs from a technique of manufacturing unleaky containers as disclosed in the WO 00/073760 or U.S. Pat. No. 6,557,395, 6,439,032 or 6,840,087 all of the same applicant as the present invention.

SUMMARY

Thereby for manufacturing unleaky containers which have a first flexible wall area and a second flexible wall area of different flexibility characteristics the present invention is a manufacturing method wherein after having provided a closed container, at least one biasing member is moved towards and onto one of the first and second flexible wall areas of the container. Such biasing moving is stopped. A biasing force on the container is monitored and the biasing force as monitored is sampled resulting in a first force measuring signal at a first point in time. The addressed biasing force as monitored is further sampled at least at one second subsequent point in time which results in a second force measuring signal. A difference signal is generated in dependency of the first and second force measuring signals. The addressed container is considered unleaky if the difference signal fulfils a test criterion. Thereby the biasing member is moved towards and onto the first flexible wall area of the container and monitoring the biasing force is performed at the second flexible area. Sampling of the biasing force monitored which results in the addressed first force measuring signal comprises determining a maximum force signal value having occurred during a time span up to and including the first point in time.

In one embodiment of the addressed method the biasing member is moved up to a predetermined position with respect to the container which is in one embodiment defined by a mechanical stop. Further in one embodiment stopping of the biasing member is performed at least substantially at the first point in time thus at least substantially at that moment at which sampling of the biasing force monitored results in the first force measuring signal.

In one embodiment a predetermined time span is selected and the maximum force value having occurred during this predetermined time span up to and including the first point in time is determined.

In one embodiment biasing comprises moving at least two biasing members towards and onto the first flexible wall area from opposite sides of the container.

In one embodiment the first flexible wall area of the container is a wall area of a body of the container and the second flexible wall area is a sealing cover of an opening of the container body.

Thereby in one embodiment the second flexible area is a foil-like sealing cover of the addressed opening.

In a further embodiment monitoring the biasing force at the second flexible wall area is performed along a force sensing surface which is spaced from the second flexible area by a predetermined amount, said second flexible wall area being thereby considered at unbiased condition of the container. This predetermined amount is substantially smaller than a maximum distance which the second flexible wall area may at all bow outwards due to an increased pressure in the closed container.

In one embodiment monitoring the biasing force comprises monitoring by means of a resistance gauge.

In a further embodiment of the addressed method the biasing force as monitored is compared at a third point in time previous to said first point in time with a threshold value and a container is established as having a large leak if the force monitored does not at least reach the threshold value.

In a further embodiment of the manufacturing method a multitude of containers is provided, moving on a conveyor and moving the biasing members, stopping same, monitoring the biasing force, performing the addressed samplings, generating the difference signal and further performing the addressed leaky/unleaky consideration is performed on more than one of the moved containers on the conveyor at least substantially simultaneously.

In a further embodiment the force monitored is compared at a third point in time previous to the first point in time with a threshold value and there is established a container as having no large leak if the force as monitored at the third point in time at least reaches the threshold value. The force value monitored at the addressed third point in time if the threshold value is at least reached is averaged with such force values generated at previously tested containers which have been considered as having no large leak and the threshold value is applied in dependency of a result of such averaging.

In a further embodiment the difference signal is compared with a small-leakage-indicative threshold value.

Still in a further embodiment the difference signal is averaged with such difference signals which have been generated during previous testing of containers having been considered as unleaky, whereby the small-leakage-indicative threshold value is controlled in dependency of the result of such averaging.

Still in a further embodiment there is provided at least one force threshold value and the force monitored is compared with such threshold value whereby the addressed threshold value is updated as a function of comparing result.

The various embodiments as defined above with their specific features may be combined thereby defining for still further embodiments of the method for manufacturing closed unleaky containers with accordingly combined features.

The leak testing apparatus according to the present invention for leak testing a closed container with at least a first and a second flexible wall area of different flexibility characteristics comprises a biasing arrangement for compressing a container under test. It further comprises a force detector which is applicable to the wall of the container under test and which generates an electric output signal. The output of the addressed force detector is operationally connected to a storing unit, the output of which being operationally connected to one input of a comparator unit, the second input thereof being operationally connected to the output of the force detector. The biasing arrangement is positioned so as to bias the first flexible area of the container and the force detector is positioned to cooperate with the second flexible area of the container.

In one embodiment of the apparatus the biasing arrangement comprises at least two relatively movable biasing members relatively movable in a plane. Thereby the force detector has a force sensing surface which detects forces substantially perpendicular to the addressed plane.

In a further embodiment of the apparatus the force detector comprises a resistance gauge.

Still in a further embodiment the biasing arrangement cooperates with a mechanical stop limiting its biasing action upon the container.

Still in a further embodiment of the apparatus the output of the force detector is operationally connected to an input of a maximum value detecting unit.

Still in a further embodiment of the apparatus according to the present invention it comprises a conveyor arrangement for a multitude of the addressed containers. At least two of the addressed biasing arrangement and force detector are provided moving with the conveyor.

The various embodiments of the apparatus may thereby be combined resulting in further embodiments of such apparatus with combined features.

There is further provided a method for manufacturing unleaky closed containers with a first and a second flexible wall area of different flexibility characteristics wherein a closed container is provided and at least one biasing member is moved relatively towards and onto one of the flexible areas of the container. The addressed moving is stopped. The biasing force on said container is monitored. The biasing force as monitored is sampled which results in a first force measuring signal at a first point in time. The biasing force monitored is sampled at least at one second subsequent point in time which results in a second force measuring signal. A difference signal is generated in dependency of the first and the second force measuring signals as a leak indicative signal. An average signal of difference signal as generated during previous testing of containers is updated with the actual difference signal, if the container actually under test is unleaky. The difference signal is thereby compared with at least one threshold signal which threshold signal is controlled in dependency of the addressed average signal. Thereby moving the biasing member is performed relatively towards and onto the first flexible wall area and monitoring the biasing force is performed on the second flexible wall area. Sampling the biasing force monitored which results in the first force measuring signal comprises determining a maximum force signal value which has occurred during a time span up to and including the first point in time.

Still in a further embodiment there is provided a method for manufacturing unleaky closed containers with a first and with a second flexible wall area of different flexibility characteristics. Thereby a closed container is provided and at least one biasing member is moved relatively towards and onto one of said flexible wall areas of the container. The moving is stopped. A biasing force on the container is monitored. The biasing force as monitored is sampled which results in a first force measuring signal at a first point in time. The biasing force monitored is further sampled at least at one second subsequent point in time which results in a second force measuring signal. A difference signal is generated in dependency of the first and second force measuring signals as one leak indicative signal. The biasing force as monitored is further sampled at a further point in time resulting in an actual further force measuring signal which is leak indicative. An average signal of further force measuring signals is generated during preceding testing of unleaky containers and such averaged signal is updated with the actual further force measuring signal if the actual further force measuring signal indicates an unleaky container. The difference signal is thereby compared with a threshold value which depends from the addressed average signal. A container which is indicated as leaky is rejected.

Movement of the biasing member is performed relatively towards and onto the first flexible wall area and monitoring the biasing force is performed on the second flexible area. Sampling of the biasing force as monitored which results in the first force measuring signal comprises determining a maximum force signal value having occurred during a time span up to and including the first point in time.

Still in a further embodiment there is provided a method for manufacturing closed containers with a flexible wall portion wherein a closed container is provided and is biased. A biasing force on the container is monitored and from such force as monitored a maximum force value as occurring during a time span is detected. A signal which depends on the addressed maximum force value as detected is stored and compared with a signal dependent on the biasing force as monitored. The container is rejected as leaky in dependency of a result of the addressed comparing.

BRIEF DESCRIPTION OF DRAWINGS

The invention shall now be further exemplified with the help of figures. These figures show.

DETAILED DESCRIPTION OF EMBODIMENTS

Figure 1:
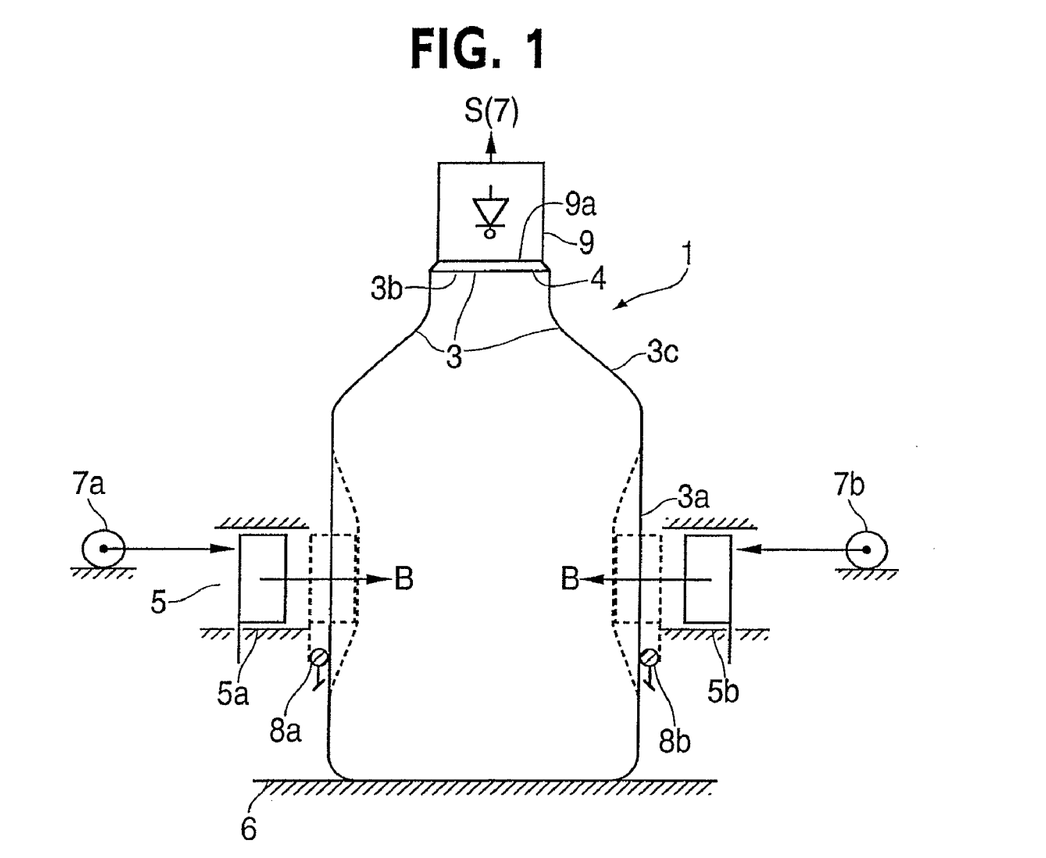
FIG. 1 schematically and simplified a closed container being leak tested in the frame of manufacturing such containers being unleaky and according to the present invention.

FIG. 1 shows schematically the principal according to the present invention. A closed container 1 to be leak tested e.g.

within a production line for finally manufacturing exclusively unleaky containers, has a first area 3a of its overall wall 3 which is flexible. The opening 4 of container 1 is sealingly closed by a sealing foil-like member, which is a second flexible area 3b of the container's wall 3. The areas 3a and 3b are of different flexible characteristic. As an example and most common the container 1 is a bottle the bottle wall 3c of which being of a plastic material the opening of which being sealed with a foil-like cover 4 which is sealed to the border of the opening 4 of bottle wall 3c e.g. by welding. The foil-like cover is on one hand and as was addressed flexible but substantially non-elastic as made of a metalized plastic foil or a plasticized metal foil as of aluminum. In opposition to this second flexible area 3b formed by the addressed sealing foil-like cover the first flexible area 3a of bottle-wall 3c is of thicker plastic material and is more elastic. Thus the addressed first and second areas 3a, 3b of the overall container's wall 3 are of different flexibility characteristics.

For leak testing the container 1 is positioned between two biasing members 5a and 5b of a biasing arrangement 5. The biasing members 5a and 5b are relatively moved towards and from each other to provide a biasing load B on the first flexible area 3a. Thereby in the embodiment as shown in FIG. 1 both members 5a and 5b are equally moved towards and from each other and with respect to a mechanic machine reference 6 e.g. a conveyor for the container 1. By moving the members 5a, 5b towards each other the container 1 is squeezed at the area 3a to bow inwardly as shown in dashed line. Due to the increased pressure within container 1 caused by the addressed squeezing biasing by biasing arrangement 5, the second flexible area 3b formed by the sealing foil-like member is bowing outwards as also shown in FIG. 1 and, in an enlarged representation, in FIG. 2. The outwards bowing second flexible area 3b is thereby pressed against the sensing surface $9_a$ of a force detector 9 which is stationary with respect to the mechanical reference 6 of the testing machine. The distance d between the second flexible wall portion 3b formed by the sealing foil-like member and the sensing surface 9a of the force detector 9 is selected much smaller than the maximum distance D the foil-like member may bow outwards due to an increased pressure inside the container 1; in this respect FIG. 2 does not show the correct relation of d and D. For a circular area 3b with a radius in the range of 1 or 2 cm the spacing d is selected e.g. to be 0.5 mm. The effect of selecting the spacing d small is that bowing outwards of the second flexible area 3b is limited to such an extent that the sealing link or weld 5 is substantially not mechanically loaded by tensile strength by the outwards bowing.

As further shown in FIG. 1 schematically, the relative movement of the biasing members 5a and 5b to squeeze first flexible area 3a is generated by respective drives 7a and 7b and is limited by respective stops 8a and 8b.

Figure 3:
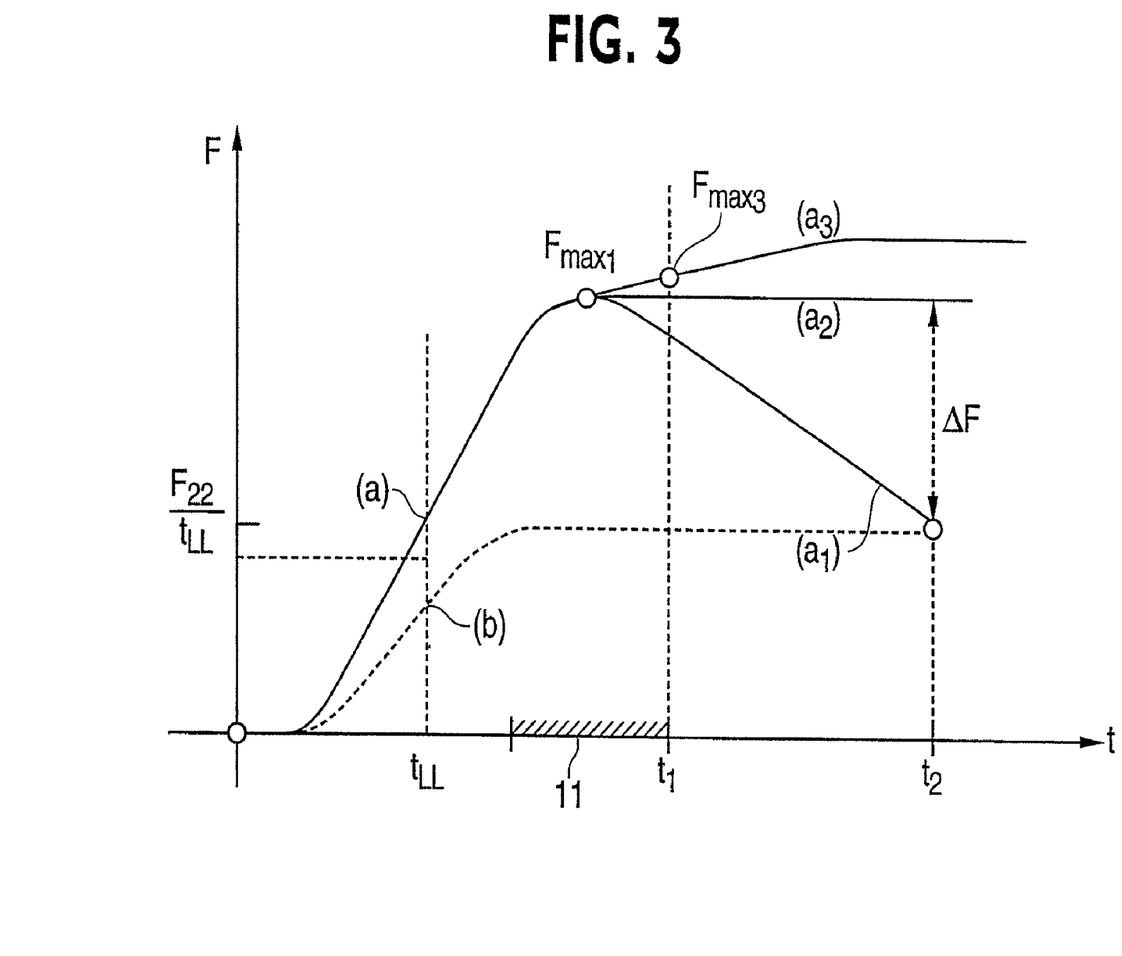
FIG. 3 qualitatively different force versus time characteristics at containers tested with an apparatus according to the present invention and by a testing procedure in the frame of the manufacturing method according to the present invention.

In FIG. 3 a qualitative force versus time diagram explaining the inventive method as performed by the inventive apparatus, is shown. At times O according to FIG. 3 the biasing movement of the two biasing members 5a and 5b is initiated. Because the characteristic of movement i.e. acceleration and thus speed as generated by the drives 7a and 7b upon the biasing members 5a and 5b is known the time span for moving the biasing members 5a and 5b up to the stops 8a and 8b of FIG. 1 is known and shown in FIG. 3 by the time span up to t1. When the biasing members 5a and 5b have contacted the first flexible area 3a then, squeezingly bias that area 3a the pressure within container 1, irrespective whether filled with a product or not, rises which leads to the second flexible area 3b formed by the sealing foil-like member being bowed outwards. As soon as the gap with the spacing d is bridged by the outbowing second flexible area 3b and due to still increasing biasing movement of the members 5a and 5b as well as due to the increasing contact surface between the outwards bowing second surface area 3b and the sensing surface 9a of force detector 9, the force F sensed by this stationary force detector 9 increases. At least a part of the course of force over time F(t) up to t1 is monitored. By means of maximum value detection, the maximum value of force as monitored by the force detector 9 up to $t_1$ is determined. Thereby and in one embodiment as shown in FIG. 3, by course ($a_1$) the movement characteristic of the drives 7a and 7b and positioning of the stops 8a and 8b is selected so that the course F(t) as monitored by force detector 9 will reach a maximum value within the time span up to $t_1$. Nevertheless in FIG. 3, purely quantitatively, three positive types of courses F(t) are shown as ($a_1$), ($a_2$) and ($a_3$). If the course substantially accords with ($a_1$) there is thus determined by maximum value detection up to $t_1$ the value $F_{max1}$. This course ($a_1$) is encountered if the container is leaky but has not a large leak as will be addressed later. The courses F(t) according to ($a_2$) or ($a_3$) indicate that the container is either unleaky or has a small leak. If the course accords with ($a_2$), the maximum force value detected up to $t_1$ accords with $F_{max1}$. If the course F(t) accords with ($a_3$) then the maximum force value detected up to the time $t_1$ is $F_{max3}$.

Irrespective as to when the maximum force value $F_{max}$ occurs at the time $t_1$ during the time span O to $t_1$ this maximum value is detected.

If the container 1 under test has a large leak LL then the course F(t) will be as qualitatively shown by course (b) in FIG. 3. To prevent further biasing squeeze by the biasing members 5a and 5b of a large leak container 1 there is established at least one further predetermined time $t_{LL}$ or time span starting with O-time, and there is monitored at this time $t_{LL}$ whether the course F(t) of the container under test at least reaches a predetermined force value $F_{LL}$.

If there is detected that at time $t_{LL}$ the threshold force value $F_{LL}$ is not reached as shown by course (b) of FIG. 3, then further biasing squeeze by the members 5a and 5b is stopped before having reached their respective stops 8a and 8b so as to prevent squeezing out content of the container 1 through a large leak. If the container 1 under test has not a large leak LL then the maximum force value $F_{max}$ is detected within the time span up to $t_1$ irrespective as to the time when such maximum value occurs and irrespective as of its absolute value. Thus different containers without a large leak may lead to maximum force values $F_{max}$ of different absolute values and such maximum values may occur during the time span up to $t_1$ at different times.

With respect to determining or detecting the maximum force value $F_{max}$ from the force versus time course F(t) at a container under test different possibilities are known to the skilled artisan. One straight ahead possibility which also takes courses of the type according to ($a_2$) and ($a_3$) into account is to sample and memorize force values of course F(t) and after $t_1$ has been reached to select the largest force value which has been memorized. This is easily done by analogue to digital conversion of the electric output signal of the force detector 9 and storing in fact the force versus time course by digital samples. Further and following up this technique it is perfectly clear to the skilled artisan that only that part of the time course F(t) be memorized in which the maximum force value $F_{max}$ is expected to occur. This area of the time course is shown in FIG. 3 purely as an example by area 11. This reduces the amount of memory necessary to determine the maximum force value $F_{max}$.

Considering the generated course (a) which defines for containers without large leak LL we have explained that irrespective of the type of such course as of $a_1$ to $a_3$ the maximum force value $F_{max}$ is determined and is stored. After a predetermined time span $t_2-t_1$ a further force measurement is made at the respectively prevailing course and the difference of this force as measured at $t_2$, $F(t_2)$ to the respective maximum value $F_{max}$ is evaluated as a small leak indicative signal. Thus for the course ($a_1$) the difference signal $\Delta F$ is generated as indicated in FIG. 3 whereas for the courses ($a_2$) and ($a_3$) such difference would be zero or negative.

Figure 4:
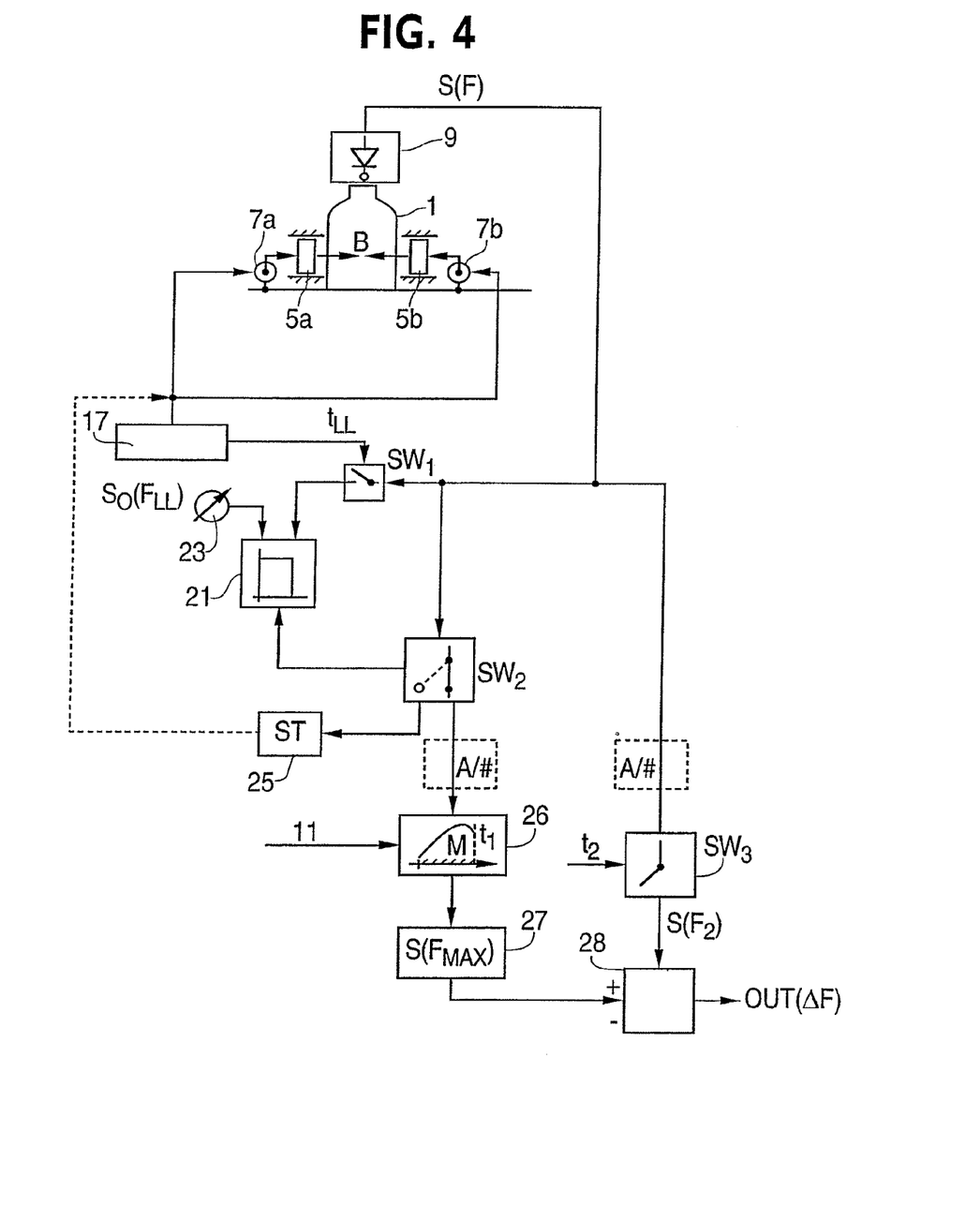
FIG. 4 a simplified signal flow/functional block diagram of an apparatus according to the present invention operating according to the leak testing procedure within the frame of the manufacturing method according to the present invention.

In FIG. 4 the inventive apparatus in its principal form which performs the procedure as explained with the help of FIG. 3 is schematically shown. Thereby the same reference numbers are used as in the previous figures with respect to features already described. The container 1 to be tested is positioned between the biasing members 5a and 5b which are driven by drives 7a and 7b. The stops 8a, 8b which have been explained in context with FIG. 1 are not shown in this figure. A timing unit 17 initiates the biasing movement B of the biasing members 5a and 5b and thereby establishes with an eye on FIG. 3 for the zero time O. The force depending electrical output signal S(F) of force detector 9 is fed at predetermined time $t_{LL}$, controlled by the timing unit 17 as schematically shown and by switching unit SW1 to a comparator unit 21. Thus at time moment $t_{LL}$ the output signal S(F) is compared with a large leak indicative threshold value $S_o(F_{LL})$ as generated by unit 23. Whenever at the moment $t_{LL}$ $S_o(F_{LL})$ is not reached by the force signal S(F), switching unit $SW_2$, the input thereof being operationally connected to S(F) is opened disabling, via a control unit 25 further biasing of container 1 by the biasing members 5a and 5b. If the threshold value $S_o(F_{LL})$ is at least reached by S(F) at the moment $t_{LL}$, then signal S(F) is led via $SW_2$ to a storing unit 26 which is enabled during the time span M up to the moment $t_1$ of FIG. 3 so as to store the values of the electric signal S(F) representing the relevant part of the characteristics F(t) as monitored by detector 9. The stored content of the storing unit 26 representing a part of the course F(t) up to $t_1$, is fed to a maximum detection and storing unit 27 wherein the signal $S(F_{max})$ is detected and stored which signal defines for the maximum force $F_{max}$ which has been detected by force detector 9 up to the moment $t_1$. At the moment $t_2$ again controlled by timing unit 17 the maximum value $S(F_{max})$ as well as the output signal prevailing at this moment $t_2$ at the force detector 9, $S(F_2)$, are fed to respective inputs of a comparator unit 28 which generates at its output an output signal OUT ($\Delta F$). The output OUT ($\Delta F$) of comparator unit 28 is indicative of leak small-behaviour of the container 1 under test.

Figure 2:
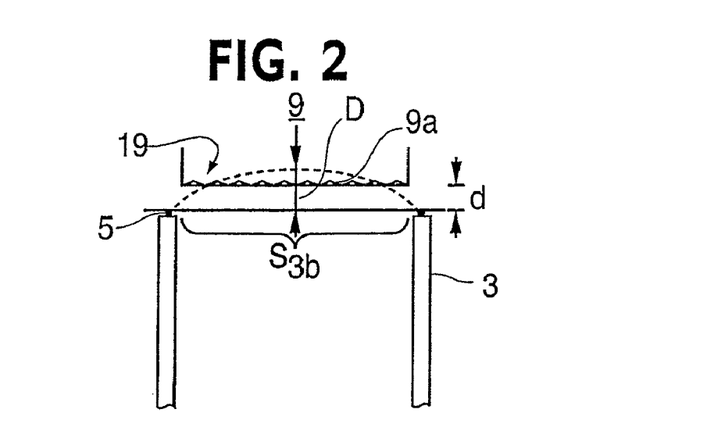
FIG. 2 an enlarged area of the representation according to FIG. 1 showing biasing force monitoring at one of the flexible areas of the container's wall according to FIG. 1.

In spite of the fact that the testing method and thus the unleaky-container manufacturing method according to the present invention allows detection of leaks at any part of container's wall 3 it is especially suited for detecting leaks at the most critical parts of containers of the type as has been described in context with FIG. 1 namely with a sealing foil-like member which is e.g. welded to the border of the opening 4 of a bottle-like member. Such most critical parts are the addressed welding 5 and the sealing foil-like member per se. To avoid that pressing the sealing foil-like member which forms the second flexible area $3b$ as of FIG. 1 to the sensing surface 9a of force detector 9 a leak which is possibly present in the contacting surface of the sealing foil-like member is clogged in one embodiment the sensing surface 9a is, as schematically shown in FIG. 2 provided with a surface structure 19 which may be realized by roughening this surface to a predetermined amount. It is perfectly clear that also the contact surfaces of the biasing members 5a and 5b as well as the surface whereupon container 1 resides may be structured to avoid also there clogging of possibly present leaks.

Instead of evaluating directly the output signal OUT($\Delta F$) of comparator unit 28 it is possible to control biasing by means of the biasing members 5a and 5b as a function of this output signal thereby removing the stops 8a and 8b as of FIG. 1. Thereby a negative feedback control loop is installed (not shown) wherein the comparator unit 28 compares a rated value according to the detected and stored maximum force signal $S(F_{max})$ from unit 27 with an instantaneously prevailing signal S(F) and applying as an adjusting unit in the negative feedback control loop the drives 7a and 7b operating the biasing members 5a and 5b so as to minimize the output signal OUT ($\Delta F$) of comparator unit 28. Thereby the control signal applied to the drives 7a and 7b is exploited as a leak indicative signal.

Figure 5:
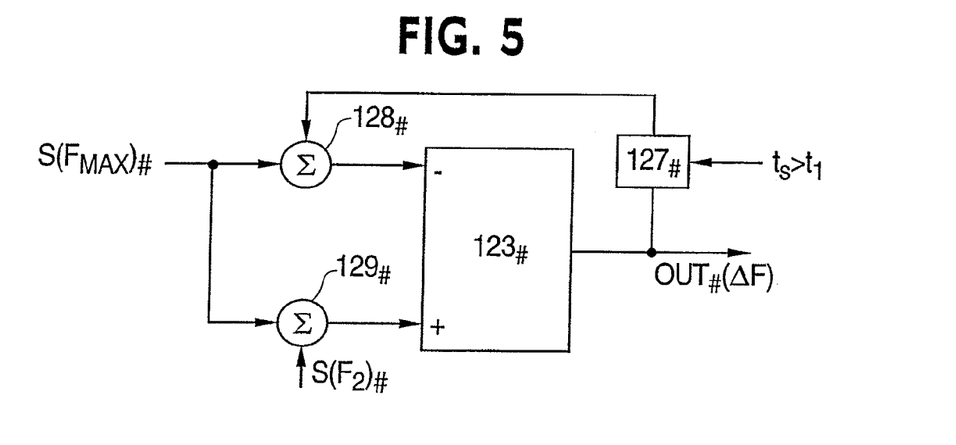
FIG. 5 an embodiment for accurately performing digital signal comparison as applicable at the apparatus according to FIG. 4.

In FIG. 5 one realization form of comparator unit 28 is schematically shown. As was addressed above memorizing the relevant part of the force versus time representing signal S(F) as in unit 26 and determining therefrom the maximum value $S(F_{max})$ is in one embodiment performed digitally. To do so according to FIG. 4 there is installed upstream unit 26 an analogue to digital conversion unit as shown in dash lines. According to FIG. 5 the detected digital signal $S(F_{max})_\#$ is fed to one input of a difference forming unit $123_\#$. As schematically shown in FIG. 5 e.g. at the time $t_1$ or later the same stored digital signal $S(F_{max})_\#$ is fed also to the second input of difference forming unit $123_\#$. Thus at this moment the output of the difference forming unit $123_\#$ should be zero. If this output signal deviates from zero it is considered as an offset signal and is stored in a storing unit $127_\#$ and applied for compensation purposes to the difference forming unit $123_\#$ e.g. and as shown in FIG. 5 via an adding unit $128_\#$ upstream one of the inputs of difference forming unit $123_\#$.

At moment $t_2$ according to FIG. 3 the digital signal $S(F_2)_\#$ (see analogue/digital conversion upstream $SW_3$ in FIG. 4) is added as schematically shown in FIG. 5 by adding unit $129_\#$ to the still prevailing signal $S(F_{max})\#$. Thereby the dynamic range of difference forming unit $123_\#$ is fully exploited. The same principle may also be realized in analogue signal processing technique.

Figure 6:
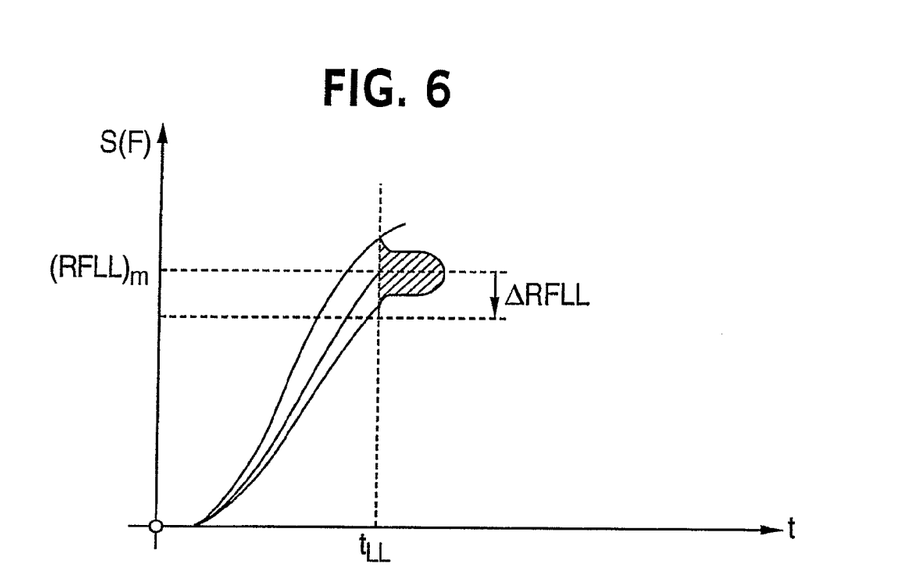
FIG. 6 different courses of force dependent signals over time as encountered at equally unleaky equal containers and as caused e.g. by manufacturing tolerances or varying environmental parameters.

In FIG. 6 there is qualitatively shown the force dependent signal S(F) at the output of force detector 9 measured at containers 1 of the same type with the same measuring equipment which containers 1 have been proven as unleaky. This may have been done by long term experiments and/or with leak detecting systems which are standard and of high accuracy but slow and/or expensive.

At $t_{LL}$ according to FIG. 3 the force values measured at these unleaky containers 1 are slightly different and define a statistic distribution. There results an average value $(RFLL)_m$. The threshold value $S_o(F_{LL})$ of FIG. 4 is found by substracting from the value $(RFLL)_m$ an offset value $\Delta RFLL$ the magnitude of which being selected according to the allowed probability that a container which has in fact no large leak is treated as a container having such large leak. Thus the threshold value $S_o(F_{LL})$ of FIG. 4 is established in one embodiment and with an eye on FIG. 6 by the value $(RFLL)_m - \Delta RFLL$.

Figure 7:
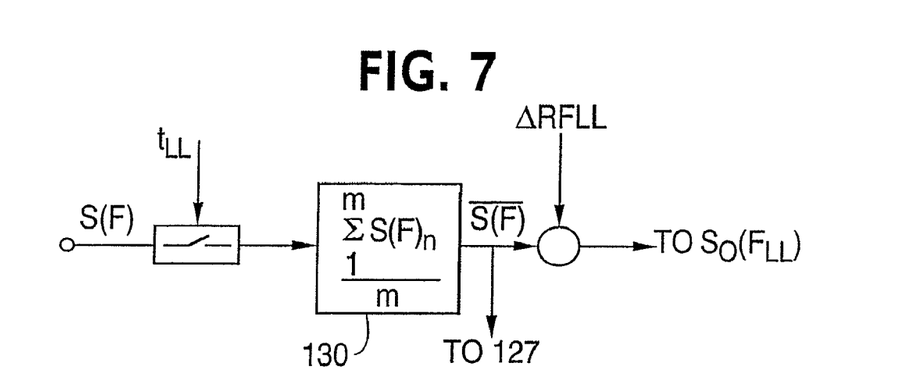
FIG. 7 an embodiment for generating a time varying threshold value for large leak detection.
Figure 8:
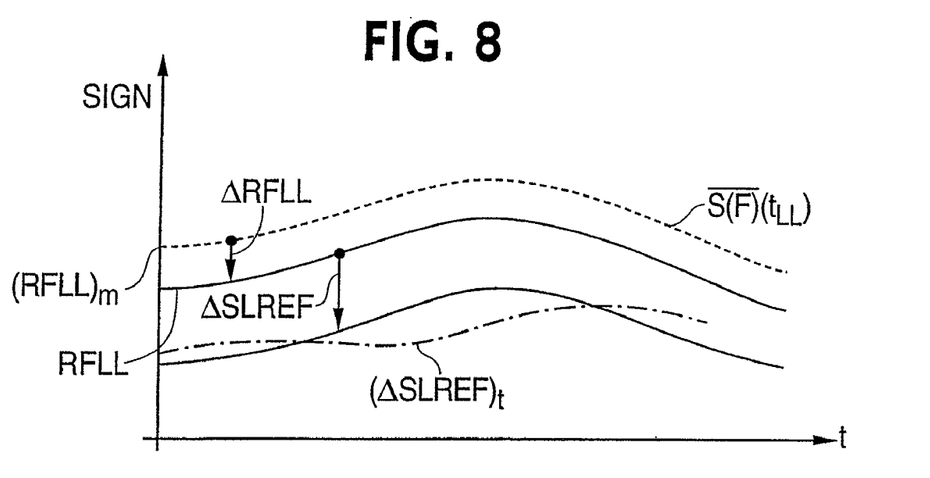
FIG. 8 qualitatively courses of time varying reference and threshold value signals as exploited in some embodiments of the present invention.

During ongoing operation on series of equal containers 1 temperature and geometry of such containers 1 may vary latter due to manufacturing tolerance. Thereby the value $(RFLL)_m$ may slowly change. Every time during multiple successive testing, at the respective times $t_{LL}$ up to which the respective container has been identified as not heavily leaky, the actual output signal of the force detector 9 is entered into an averaging unit 130 as shown in FIG. 7. Therein the last m values of the force indicative signal S(F) at $t_{LL}$ of not heavily leaky containers are averaged. The average result signal $\overline{S(F)}$ accords with the time varying value $(RFLL)_m$ of FIG. 6. From the output average result $\overline{S(F)}$ the offset $\Delta RFLL$ is subtracted and the result of this operation is a dynamically varying reference value applied as $S_o(F_{LL})$ to unit 21 according to FIG. 4. This dynamically varying reference value $S_o(F_{LL})$ of FIG. 4 is shown in FIG. 8 qualitatively starting from an initial setting as e.g. found, as was addressed, with the help of measurements at test containers 1 without large leak.

Once the container 1 under test has been found not having a large leak LL as was explained with a help of FIG. 4 there is generated at the output of comparator unit 28 an output signal OUT($\Delta F$) which is indicative for the presence of a small leak. According to FIG. 9 the output signal OUT($\Delta F$) is further evaluated by being fed to a comparator unit 125 which is enabled at or after the time $t_2$. By means of a reference value source 130 a reference value $\Delta SLREF$ is fed to comparator unit 125. As will be explained later the value of $\Delta SLREF$ may controllably be varied in time and/or a reference value $\phi_R$ to which $\Delta SLREF$ is referred to, may also controllably be varied in time. If the signal OUT($\Delta F$) at time $t_2$ is larger than the reference value $\Delta SLREF$ then a signal SL is generated at unit 125 indicating the presence of a small leak SL in the container 1 under test. If the signal OUT($\Delta F$) does not reach $\Delta SLREF$ then the container is considered unleaky as neither a large leak LL nor a small leak SL has been detected.

Figure 9:
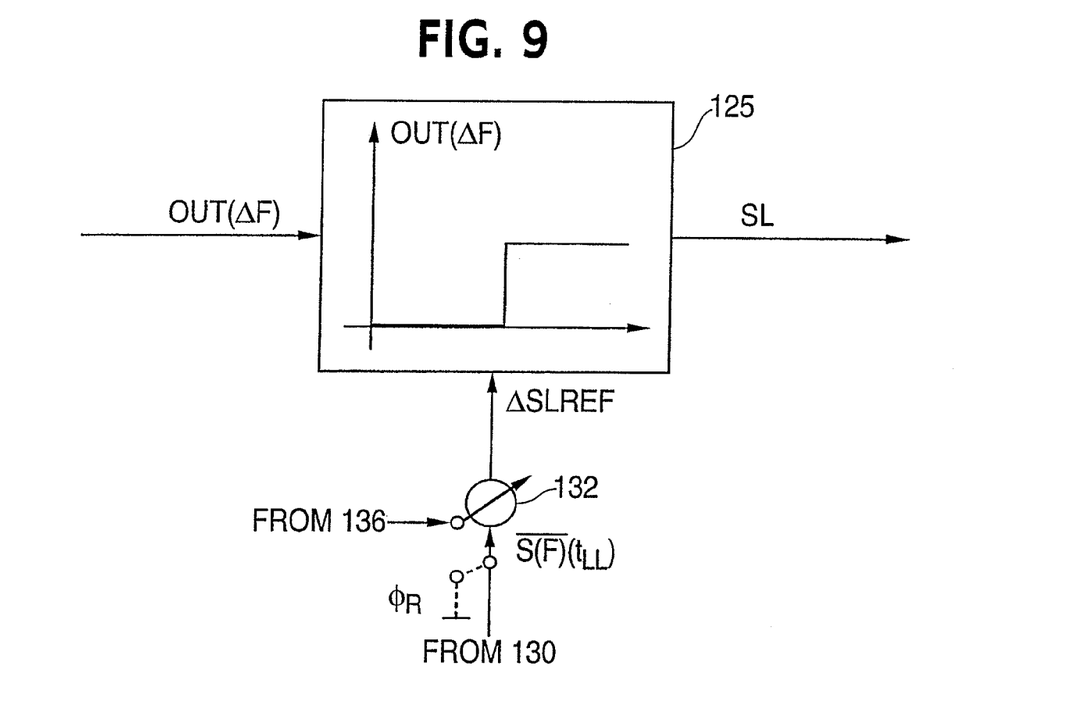
FIG. 9 by means of a simplified functional block diagram evaluating from a leak indicative signal whether a container under test has a small leak or not.

Turning back to FIG. 8 it may be seen that the average signal $\overline{S(F)}$ ($t_{LL}$) is also the basis for referring $\Delta SLREF$ of FIG. 9 to. Thus in one embodiment and as shown in FIG. 9 the reference value $\Delta SLREF$ is not referred to a static value but is referred to $\overline{S(F)}$ ($t_{LL}$), as generated at the output of averaging unit 130 of FIG. 7.

Figure 10:
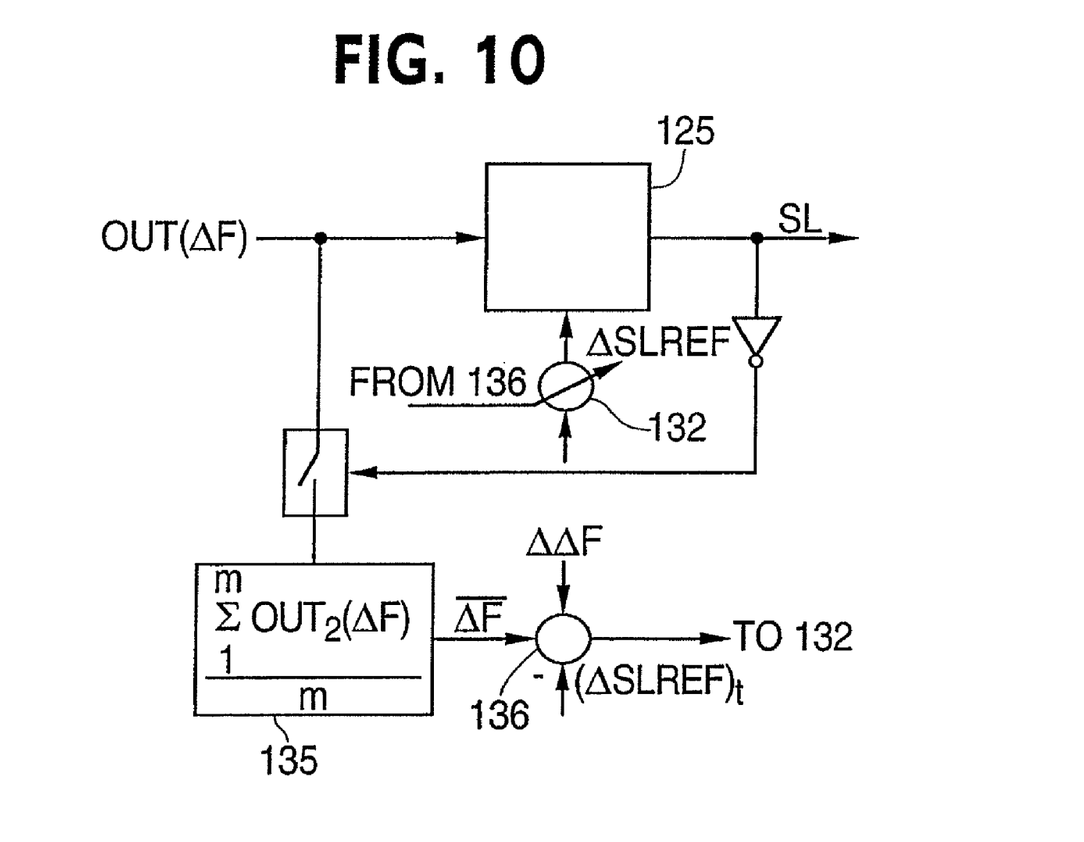
FIG. 10 for an embodiment of the present invention generating a time varying threshold value for a small leak indication.

In a further embodiment with features which may be realized separately or additionally to realizing a dynamic $S_o(F_{LL})$ and/or a dynamic base value $\overline{S(F)}$ ($t_{LL}$) for $\Delta SLREF$. Thereby and according to FIG. 10, the actual force difference signal OUT($\Delta F$) is led to an averaging unit 135 whenever the output signal SL of comparator unit 125 of FIG. 9 indicates that the container under test is unleaky. The output signal of unit 135 which accords to an average force difference signal $\overline{\Delta F}$ averaged over the last m test cycles is offset by an amount $\Delta\Delta F$, the result thereof being used as a time varying $\Delta SLREF$ signal applied at unit 125.

Looking back on FIG. 8 whereat a constant $\Delta SLREF$ signal was applied the technique of averaging $\Delta F$ results as schematically shown with a course $(\Delta SLREF)_t$ in a dynamically varying value $\Delta SLREF$, varying according to variations of disturbing parameters influencing such force difference. It is clear that provision of a dynamically varying $(\Delta SLREF)_t$ signal according to that representation in FIG. 8 could be realized without providing a dynamically varying base value $\overline{S(F)}$ ($t_{LL}$) in referring $(\Delta SLREF)_t$ to a stable constant value $\phi_R$ as shown in FIG. 9 in dash representations instead of referring to a dynamically varying $\overline{S(F)}$ ($t_{LL}$) value.

Figure 11:
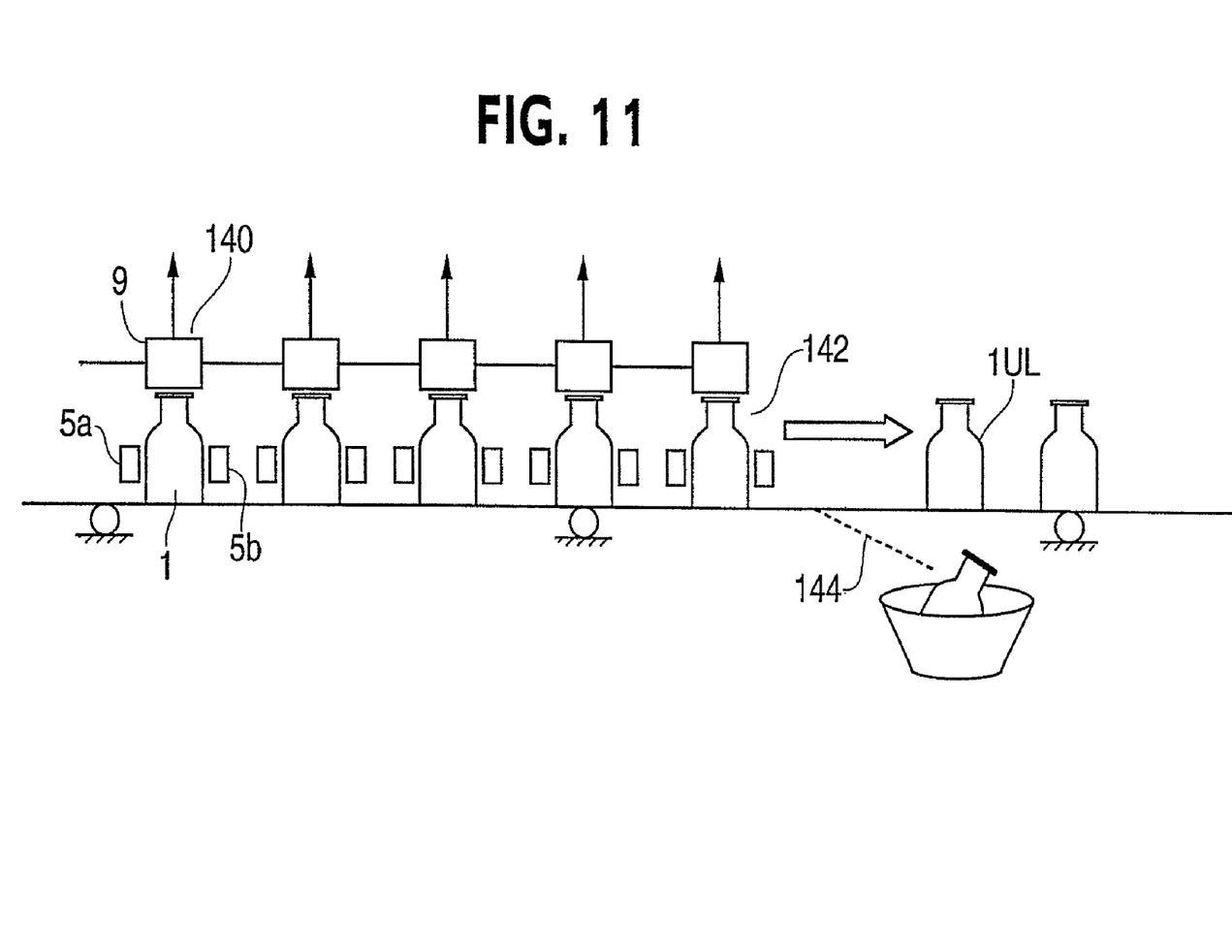
FIG. 11 in a simplified and schematic representation, an inline leak testing apparatus according to the present invention for high-rate container testing as applied in the frame of the manufacturing method according to the present invention, finally selecting only unleaky containers out of a stream of closed containers.

According to FIG. 11 a multitude of testing stations 140 are moved with a conveyor arrangement 142 for containers 1 to be tested. During the conveying course of the containers 1 they are brought into the testing stations 140 which keep moving with the conveyor arrangement 142. Each testing unit 140 is construed as has been explained. In the simplified representation of FIG. 11 the respective squeezing biasing members 5a and 5b at each testing station are shown as well as the force detectors 9. Without interruption of conveying and the containers 1 become biasingly squeezed by the biasing members 5a and 5b and the resulting force on the respective force detector 9 is evaluated. If a container is detected to be leaky it is separated from the unleaky containers as schematically shown by selecting switch 144 resulting in a train of containers $1_{UL}$ which are unleaky. Thus the result of container testing is the manufacture of unleaky containers $1_{UL}$.

As force detector 9 different known detectors as e.g. Piezzo detectors may be used. In a today realized embodiment the force detector 9 includes a resistance strain gauge sensor as e.g. of the type Z6 as manufactured by Hottinger Baldwin Messtechnik GmbH, Germany.

With the today's realized embodiment for inline testing a stream of plastic material bottles sealingly closed with a foil-like member as was described an output rate is reached which is far above 600 bottles per minute. The extreme high output rate is primarily based on the very quick testing method in which squeezingly biasing of the containers 1 is established by a quick movement of the biasing members 5a and 5b up to their respective stops 8a and 8b as of FIG. 1. Because according to FIG. 11 more than one container, during their conveyance, are tested in parallelism the addressed high testing rate is even increased.

The invention claimed is:

1. A method for manufacturing unleaky closed containers having a flexible wall and an opening closed by a flexible seal which bows out by an amount whenever the interior of said container is pressurized, comprising:
    applying a force on a container;
    measuring a force applied on the container by a force detector which generates an output signal;
    establishing if the container is unleaky/leaky based on the output signal of the detector;
    wherein the force detector is applied adjacent to or in contact with the flexible seal and said force detector limits bowing out of said flexible seal to a reduced amount with respect to said amount.

2. The method of claim 1, wherein said applying a force on the container biases the flexible wall of the container toward the interior of the container.

3. The method of claim 1, wherein said applying a force on the container includes moving a biasing member up to a predetermined position with respect to the container.

4. The method of claim 1, wherein said applying a force on the container includes moving at least two biasing members toward and onto the flexible wall from opposite sides of the container.

5. The method of claim 1, including measuring a force applied on the container by the force detector at a first point in time to generate a first force indicative signal, measuring a force applied on the container by the force detector at a second point in time to generate a second force indicative signal, generating a difference signal from said first and second force indicative signals as a leak indicative signal and considering said container as unleaky if said difference signal fulfills a test criterion.

6. The method of claim 5, further comprising measuring a force applied on the container by the force detector at a third point in time previous to said first point in time and comparing a force indicative signal prevailing at the third point in time with a threshold value and establishing a container as having a large leak if said force indicative signal at said third point in time does not at least reach said threshold value.

7. The method of claim 5, further comprising providing at least one force indicative threshold value and comparing a force indicative signal dependent on said output signal with said force indicative threshold value, thereby updating said force indicative threshold value as a function of a result of said comparing.

8. The method of claim 5, including comparing said difference signal with a small leakage indicative threshold value.

9. The method of claim 8, further comprising the step of averaging said difference signal with such difference signals generated during previous testings of containers having been considered as unleaky and controlling said small leakage indicative threshold value in dependency of the result of said averaging.

10. A leak testing apparatus for leak testing a closed container having a flexible wall and an opening closed by a flexible seal which bows out whenever the interior of said container is pressurized, the apparatus comprising:
 a biasing arrangement for compressing the flexible wall of the container under test;
 a force detector adjacent to or in contact with the flexible seal of a container under test, the force detector generating an output signal useful in establishing if the container is unleaky/leaky, wherein the force detector limits bowing out of said flexible seal.

11. The apparatus of claim 10, wherein said biasing arrangement includes at least two relatively movable biasing members, relatively movable in a plane and said force detector has a force sensing surface detecting forces substantially perpendicular to said plane.

12. The apparatus of claim 10, wherein said force detector includes a resistance gauge.

13. The apparatus of claim 10, wherein said biasing arrangement includes at least two relatively movable biasing members drivingly movable toward and away from each other.

14. The apparatus of claim 10, wherein said biasing arrangement cooperates with a mechanical step.

15. The apparatus of claim 10, wherein the output of said force detector is operationally connected to an input of a maximum value detecting unit.

16. The apparatus of claim 10, further comprising a conveyor arrangement for a multitude of said containers, at least two of said biasing arrangement and force detector moving with said conveyor.

17. The apparatus of claim 10, further comprising:
 a storing unit;
 a comparator unit; and
 wherein the output of said force detector is operationally connected to said storing unit; wherein the output of said storing unit is operationally connected to one input of said comparator unit and a second input thereof is operationally connected to the output of said force detector.

* * * * *